(12) United States Patent
Ito

(10) Patent No.: US 6,600,571 B1
(45) Date of Patent: Jul. 29, 2003

(54) METHOD, APPARATUS AND RECORDING MEDIUM FOR IMAGE PRINTING

(75) Inventor: Wataru Ito, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/359,647

(22) Filed: Jul. 26, 1999

(30) Foreign Application Priority Data

Jul. 27, 1998 (JP) .......................... 10-210867
May 24, 1999 (JP) .......................... 11-143514

(51) Int. Cl.[7] .............. G06F 15/00; G06K 9/00; G06K 9/36; G06K 9/54
(52) U.S. Cl. ............ 358/1.15; 382/162; 382/232; 382/306
(58) Field of Search .................. 358/1.15; 382/100, 382/162–167, 232, 243–250, 305, 306, 135

(56) References Cited

U.S. PATENT DOCUMENTS

| 5,530,759 | A | * | 6/1996 | Braudaway et al. | 380/54 |
|---|---|---|---|---|---|
| 5,710,636 | A | * | 1/1998 | Curry | 358/3.28 |
| 6,252,971 | B1 | * | 6/2001 | Wang | 382/100 |
| 6,263,086 | B1 | * | 7/2001 | Wang | 382/100 |
| 6,301,013 | B1 | * | 10/2001 | Momose et al. | 358/1.15 |
| 6,396,594 | B1 | * | 5/2002 | French et al. | 358/1.18 |
| 6,438,251 | B1 | * | 8/2002 | Yamaguchi | 382/100 |

FOREIGN PATENT DOCUMENTS

EP  A2766468  4/1997

* cited by examiner

*Primary Examiner*—Edward Coles
*Assistant Examiner*—Monica Mitchell
(74) *Attorney, Agent, or Firm*—Birch, Stewart, Kolasch & Birch, LLP

(57) ABSTRACT

When a print of an image is generated from image data having an electronic watermark, information indicated by the electronic watermark can be notified easily to a printing requester, without a troublesome task and with only printing paper. In an image printing apparatus for obtaining an image print from image data having electronic watermark information (deep layer information) which is visually imperceptible when provided for image reproduction, the electronic watermark information is read from the image data by electronic watermark information reading component and the information having been read is developed by bit map developing component into bit map data which are visually perceptible when provided for image reproduction. A printer prints the content of the developed bit map data on the front and/or back of the image print.

17 Claims, 4 Drawing Sheets

METHOD, APPARATUS AND RECORDING MEDIUM FOR IMAGE PRINTING

BACKGROUND OF THE INVENTION

1. Field of the Invention

The present invention relates to an image printing method and an image printing apparatus, and more specifically, to an image printing method and an image printing apparatus for printing an image and information shown by an electronic watermark added to the image by causing the information to be visually perceptible.

The present invention also relates to a recording medium storing software for executing the image printing method described above.

2. Description of the Related Art

Methods of printing images based on image data have been known. Recently, printing of a photograph image by using image data representing the image obtained by a so-called digital camera has been widely carried out according to these methods.

Meanwhile, as has been described in Japanese Unexamined Patent Publication No. 9(1997)-191394, a method of embedding deep layer information, what is generally called an "electronic watermark", in various kinds of data such as image data or audio data has been proposed. The deep layer information is embedded in a manner such that the information is not perceived by normal human visual sense when the data including the information are provided for an original use. In other words, when the deep layer information is embedded in image data for example, the information is embedded in a signal component corresponding to an extremely high space frequency so that the content of the deep layer information is not visible upon reproduction of the image data.

The deep layer information of this kind has an advantage of being impossible to unintentionally delete over header information or the like conventionally added to image data.

The content of the electronic watermark to be embedded in image data cannot be seen in the reproduced image, as has been described above. Therefore, electronic watermarks can be used as encryption code. Consequently, it becomes possible for an electronic watermark regarding a copyright holder to be embedded in image data representing a photograph image, in order to prepare for copyright violation.

Therefore, when image data having an electronic watermark regarding a copyright holder are dealt with by a photographic printing system in a laboratory or the like, information regarding the copyright holder or prohibition of printing can be provided to a customer (printing requester).

However, as has been described above, since an electronic watermark is invisible in a printed image, in order to use the electronic watermark in such a manner in a photographic printing system, a troublesome task of reading the watermark from the image data by using a special electronic watermark confirming apparatus and notifying the confirmation result to the printing requester by using any means other than printing paper is necessary.

SUMMARY OF THE INVENTION

Based on consideration of the above problems, the present invention has been created. An object of the present invention is to provide an image printing method enabling easy notification of information shown by an electronic watermark to a printing requester without a troublesome task and without using means other than prints.

Another object of the present invention is to provide an image printing apparatus for carrying out such a printing method.

An image printing method of the present invention is an image printing method for obtaining an image print from image data having an electronic watermark (deep layer information which is visually imperceptible upon image reproduction, as has been described above), and the method comprises the steps of:

reading the deep layer information from the image data;

developing the deep layer information having been read into data which are visually perceptible upon image reproduction, such as into bit map data; and printing the content of the developed data on the front and/or back of the image print.

In the case where the content of the bit map data or the like is printed on the front of an image print, the content may be printed in superposition on the image or in a blank space of the print.

As has been described above, in order to print the content of the bit map data or the like over the image, a composite image of the bit map data or the like and the image may be generated or the bit map data may be written over the image data.

The deep layer information may be generated as information instructing additional printing so that print information which can be seen upon image reproduction can be generated as the developed data, based on the deep layer information having been read.

The deep layer information read from the image data may be developed not only into bit map data, but also into character code data, and information shown by the character code data may be printed on the front and/or back of the image print by a character printer.

It is preferable for the image printing method of the present invention to enable selection as to whether or not the content of the developed data is printed, or as to where to print the content of the developed data.

It is also preferable for the image data to accompany information indicating where to print the content of the developed data so that the position can be determined based on the information.

Meanwhile, it is also preferable for the image data to accompany information indicating a permitted print quantity, or to have deep layer information, a portion of which indicates the permitted print quantity. In this manner, when the number of prints exceeds the permitted quantity, a predetermined message is preferably recorded on the prints. In this case, it is preferable for the message to be printed on the front of the prints.

The present invention provides recording medium storing software to execute the image printing method, in addition to the printing method.

Meanwhile, an image printing apparatus of the present invention is an image printing apparatus for obtaining an image print from image data including an electronic watermark (deep layer information which is visually imperceptible upon image reproduction, as has been described above), and the apparatus comprises:

deep layer information reading means for reading the deep layer information from the image data;

developing means for developing the deep layer information having been read into data which are visually perceptible upon image reproduction; and printing means for printing the content of the developed data on the front and/or back of the image print.

It is preferable for the image printing apparatus of the present invention in the above configuration to comprise electronic watermark information reading/print information generating means for reading information indicating additional printing from the deep layer information read by the deep layer information reading means; and for generating print information which is visually perceptible upon image reproduction based on the information indicating the additional printing; and for inputting the print information to the printing means as the developed data.

It is preferable for the image printing apparatus of the present invention to comprise means for selecting whether or not the content of the developed data is printed.

It is also preferable for the image printing apparatus of the present invention to comprise attached information reading means for reading information of a position at which the content of the developed data is printed, from the image data having the information; and for specifying the position at which the content is printed by the printing means, based on the information having been read.

It is also preferable for the image printing apparatus of the present invention to comprise means for reading information indicating a permitted print quantity attached to the image data; and recording a predetermined message on prints (preferably on the front side of the prints) in the case where the number of prints exceeds the permitted quantity.

Alternatively, the image printing apparatus may comprise means for reading information which indicates the number of permitted prints and is formed as a portion of the deep layer information; and recording a predetermined message on prints (also on the front side of the prints, preferably) in the case where the number of prints exceeds the permitted quantity.

According to the image printing method of the present invention, deep layer information read from the image data is developed into data which are visually perceptible when provided for image reproduction, and the content of the developed data is printed on the front and/or back of an image print. Therefore, the image print itself indicates the content shown by the deep layer information in a visually perceptible manner. Consequently, according to this method, the content of the deep layer information can be notified easily to a printing requester without a troublesome task and without means other than printing paper.

In the case where printing of an image is prohibited, it is preferable for the content of the deep layer information to be printed prominently in superposition to the printed image, as has been described above. In other words, a print having a copyright holder's name or a prominent message indicating printing prohibition superposed on the image has little or no use, and the intention of prohibiting unauthorized use can be emphasized by threatening an operation that will ruin the value of the image.

Meanwhile, the method of printing the content of the deep layer information at a corner or in a blank space of the front of a print and the back as well is appropriate for the case where printing of the image itself is permitted while information regarding the image needs to be conveyed.

DESCRIPTION OF THE PREFERRED EMBODIMENTS

Figure 1:
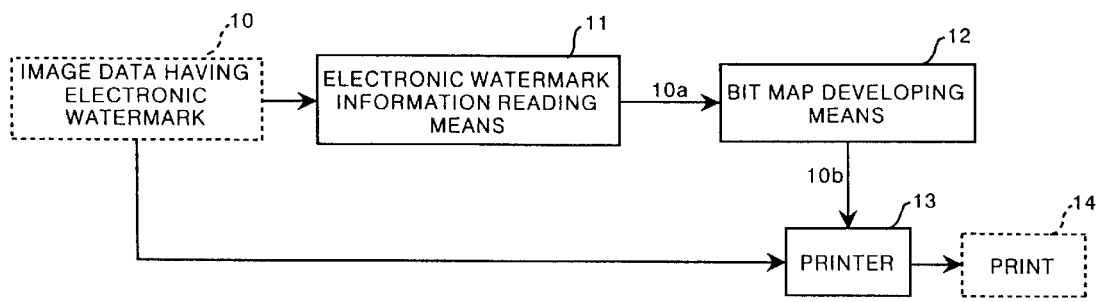
FIG. 1 is a block diagram showing an image printing apparatus according to a first embodiment of the present invention.

Hereinafter, embodiments of the present invention will be explained with reference to the accompanying drawings. FIG. 1 is a diagram showing an image printing apparatus according to a first embodiment of the present invention.

As shown in FIG. 1, the image printing apparatus comprises electronic watermark information reading means 11 to which image data 10 added with an electronic watermark (deep layer information) are input, bit map developing means 12 for receiving an output from the electronic watermark information reading means 11, and a printer 13 to which the image data 10 having the electronic watermark information are input.

The electronic watermark information reading means 11 receives the image data 10 having the electronic watermark, and reads electronic watermark information 10a embedded in the image data 10. The electronic watermark information 10a is input to the bit map developing means 12. The electronic watermark information 10a is information which is visually imperceptible when provided for image reproduction, as has been described above. The electronic watermark information 10a shows the content regarding a copyright holder, date of photographing, photographing conditions and the like of a photograph image.

The bit map developing means 12 develops the electronic watermark information 10a input thereto into bit map data 10b which are visually perceptible when provided for image reproduction, and inputs the bit map data 10b to the printer 13.

The printer 13 is for printing a color image by exposing color paper for photographic use to scanning light of 3 colors, namely red, green, and blue, and by carrying out development processing thereafter. In this example, color paper whose front and back sides can be used for recording is used. The printer 13 prints a color photograph image represented by the image data 10 on the front of the color paper 13, based on the input image data having the electronic watermark.

The image data 10 include the electronic watermark information 10a, and the content of the electronic watermark information 10a is not visually perceptible in the printed color photograph image, as has been described above.

The printer 13 prints the color photograph image as has been described above. The printer 13 also prints on the back of the color paper the information regarding the copyright holder from the content shown by the bit map data 10b, based on the bit map data 10b input from the bit map developing means 12.

Figure 2A:
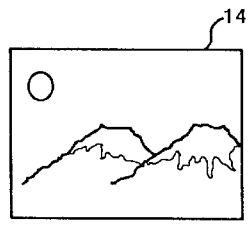
FIG. 2a is an illustration showing a state of the front of an image print obtained by the image printing apparatus shown in FIG. 1.
Figure 2B:
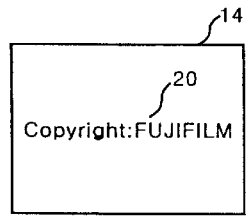
FIG. 2b is an illustration showing a state of the back of the image print obtained by the image printing apparatus shown in FIG. 1.

Through the above-described processing, a print 14 having the photograph image on its front side and the information regarding the copyright holder on its back side is obtained. FIGS. 2a and 2b show the front and back sides of the print 14 in detail. As shown in FIG. 2a, the photograph image is printed on the front of the print 14, like a normal print. On the back of the print 14, information 20 regarding the copyright holder is recorded, as an example "Copyright:FUJIFILM" shown in FIG. 2b.

When such a print is generated, information shown by the electronic watermark can be notified easily to a customer (printing requester), without a troublesome task and means other than the printing paper.

Figure 3:
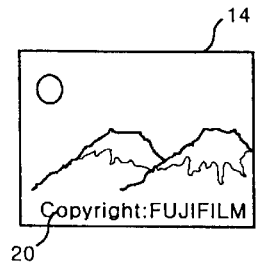
FIG. 3 is an illustration showing another state of the front of an image print obtained by an image printing method of the present invention.

The information 20 based on the bit map data 10b may be recorded on the front of the print 14 as well. For example, as shown in FIG. 3, the information 20 can be printed comparatively inconspicuously at a corner of the printed image on the front. In an example shown in FIG. 4, the information 20 is prominently printed on the front of the print 14 in superposition to the printed image.

Figure 4:
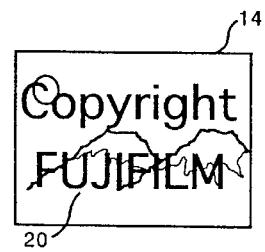
FIG. 4 is an illustration showing still another state of the front of an image print obtained by the image printing method of the present invention.

As shown by the examples in FIGS. 3 and 4, in order to print the information 20 based on the bit map data 10b in superposition to the image, the bit map data 10b may be composed with the image data 10, or written over the image data 10.

The manner shown by FIG. 4 is appropriate for the case where image printing is prohibited, due to the reason described above. On the contrary, the manner shown by FIG. 3 or FIG. 2b is appropriate for the case where image printing itself is allowed, but information regarding the image needs to be conveyed.

Figure 5:
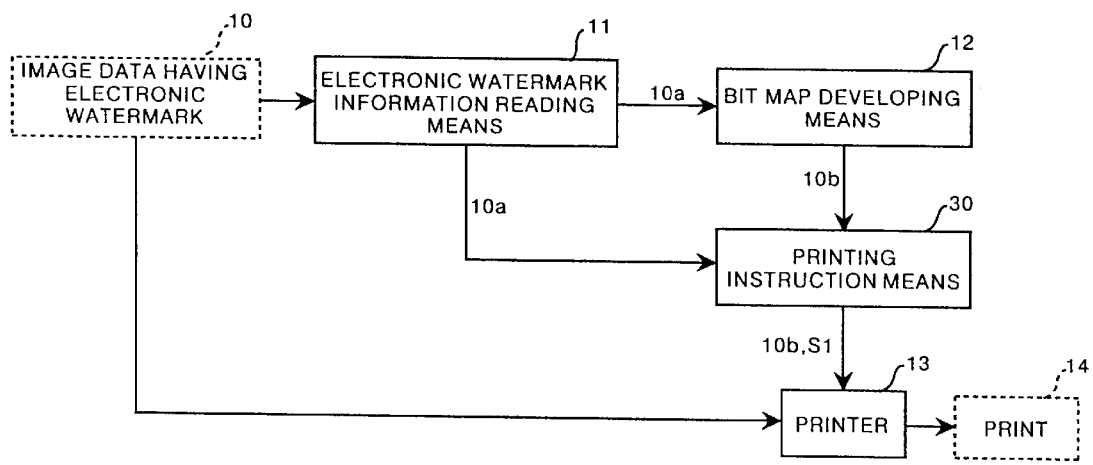
FIG. 5 is a block diagram showing an image printing apparatus according to a second embodiment.

A second embodiment of the present invention will be explained with reference to FIG. 5. In FIG. 5, the same elements as in FIG. 1 have the same reference numerals, and explanation thereof is not repeated here, (which is the same for the subsequent embodiments).

A difference of an image printing apparatus according to the second embodiment from the apparatus according to the first embodiment shown in FIG. 1 is the presence of printing instruction means 30 between the bit map developing means 12 and the printer 13. The printing instruction means 30 comprises a monitor and input means which are not shown in FIG. 5. When the electronic watermark information reading means 11 reads the electronic watermark information 10a from the image data 10, the electronic watermark information 10a is input to the printing instruction means 30.

The printing instruction means 30 displays on the monitor a message indicating that the image has the electronic watermark information, when the electronic watermark information 10a is input thereto. An operator of the printing apparatus confirms this message and can input an instruction regarding whether or not the electronic watermark information is printed. In this example, the position at which the electronic watermark information is printed can also be specified. As the position specified in this manner, positions such as the front or back of color paper, or the upper half or the lower half of the paper can be specified, for example.

When an instruction to print the electronic watermark information is input, printing position information S1 and the bit map data 10b input from the bit map developing means 12 to the printing instruction means 30 are input to the printer 13. The printer 13 prints the color photograph image represented by the image data 10 having the electronic watermark on the front of the color paper, and prints the information regarding the copyright holder for example, out of the content shown by the bit map data 10b, at the position of the color paper specified by the printing position information S1, based on the bit map data 10b.

A third embodiment of the present invention will be explained with reference to FIG. 6. An image printing apparatus according to the third embodiment has electronic watermark information reading/print information generating means 40 instead of the bit map developing means 12 in the image printing apparatus according to the first embodiment shown in FIG. 1.

In this example, text according to a predetermined format is embedded as an electronic watermark in the image data 10. As information regarding a copyright holder represented by the text, information such as "back: Copyright FUJIFILM" can be used.

The electronic watermark information reading/print information generating means 40 reads such electronic watermark information and generates the bit map data 10b such as "Copyright FUJIFILM" in the case of the above example, and generates the printing position information S1 indicating printing of the information shown by the bit map data 10b on the back. The bit map data 10b and the printing position information S1 are sent to the printer 13.

The printer 13 prints the color photograph image represented by the image data 10 having the electronic watermark on the front of the color paper, as in the second embodiment. The printer 13 also prints the information regarding the copyright holder shown by the bit map data 10b, at the position on the color paper indicated by the printing position information S1, based on the bit map data 10b.

As the information by text, not only the text such as "back: Copyright FUJIFILM" shown in the above example but also information coded by numbers or the like can be used.

In other words, for example, information using 2 numbers such as "0:1" can be recorded as the electronic watermark indicating the first number as the printing position and the second number as the copyright holder. Regarding the first number, correspondence such as 0 as front and 1 as back may be defined, while for the second number, correspondence such as 1 meaning Fuji Film, 2 Fuji Color, and 3 private can be defined, for example. These definitions can be stored as a table in the electronic watermark information reading/print information generating means 40. When the electronic information such as "0:1" is read, the electronic watermark information reading/print information generating means 40 judges that the copyright holder information such as "FujiFilm" is printed on the front of the color paper, and sends the bit map data 10b indicating this information and printing position information S1 to the printer 13.

The printer 13 prints on the front of the color paper the color photograph image represented by the input image data 10 having the electronic watermark, and prints the information regarding the copyright holder out of the content shown by the bit map data 10b, on the position on the color paper shown by the print information data S1, for example.

In this case, since only a limited number of copyright holders are shown by the second number, several patterns of bit map data 10b are preferably stored in recording means, rather than being generated each time after the electronic watermark information reading.

A fourth embodiment of the present invention will be explained with reference to FIG. 7. An image printing apparatus according to the fourth embodiment comprises attached information reading means 50 located between the bit map developing means 12 and the printer 13 in the first embodiment shown in FIG. 1.

The attached information reading means 50 receives the image data 10 having the electronic watermark and reads the printing position information S1 attached to a header of the image data 10. The attached information reading means 50 sends the printing position information S1 and the bit map data 10b from the bit map developing means 12 to the printer 13.

The printer 13 prints on the front of the color paper the color photograph image represented by the input image data 10 having the electronic watermark, and prints the information regarding the copyright holder out of the content shown by the bit map data 10b, at the position on the color paper shown by the printing position information data S1, for example.

A fifth embodiment of the present invention will be explained with reference to FIG. 8. In an image printing apparatus according to the fifth embodiment, the printer 13 of the image printing apparatus according to the fourth embodiment shown in FIG. 7 is replaced by a printer 13' shown in FIG. 8.

Figure 8:
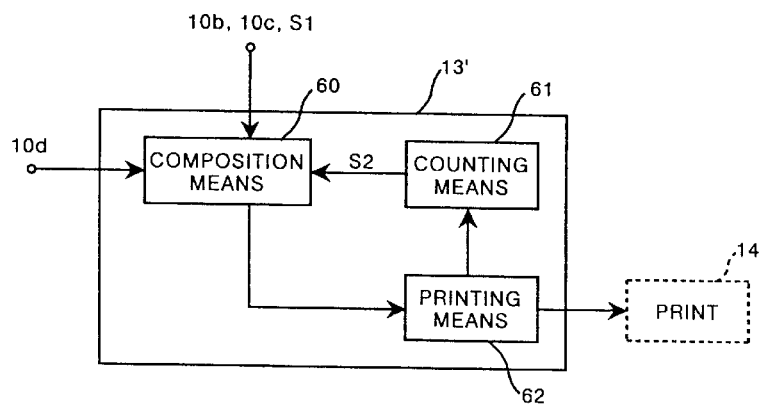
FIG. 8 is a block diagram showing a main portion of an image printing apparatus according to a fifth embodiment of the present invention.

The printer 13' in FIG. 8 comprises composition means 60, print quantity counting means 61 and printing means 62. Image information 10d of the image data 10 having the electronic watermark, and print quantity information S2 output from the counting means 61 which counts the number of prints generated by the printing means 62 are input to the composition means 60.

The bit map data 10b and the printing position information S1 from the attached information reading means 50 (see FIG. 7) and permitted print quantity information 10c attached to the header of the image data 10 having the electronic watermark are also input to the composition means 60. The composition means 60 sends the image information 10d to the printing means 62 while the number of prints shown by the printing quantity information S2 is smaller or equal to the number shown by the permitted print quantity information 10c, and causes the printing means 62 to print the color photograph image represented by the image information 10d on the front of the color paper.

When the printing operation is continued after the number of prints shown by the printing quantity information S2 reaches the number shown by the permitted print quantity information 10c, the composition means 60 composes the image information 10d with the bit map data 10b and sends the composite image to the printing means 62. In this manner, the print 14 has the information regarding the copyright holder indicated by the bit map data 10b printed at the position on the color paper shown by the printing position information S1.

In this case, as shown in FIG. 4, it is preferable for the information 20 based on the bit map data 10b to be printed in superposition to the image. Alternatively, a message such as "Printing Prohibited" is printed together with the information regarding the copyright holder, thus enhancing an effect of prohibiting unauthorized printing.

As the situation wherein the electronic watermark information is printed in accordance with the print quantity, the case where the number of prints is controlled by cartoon character postcard generating software is possible, for example.

In such a case, the permitted print quantity information may be added to an image file for postcard generation. An image is generated according to an instruction from a user showing the quantity. The quantity information is sent to a copyright manager via a network and the copyright is managed thereby. Alternatively, the copyright can be managed by setting the permitted print quantity upon application software purchase and by decreasing an internal counter of the application software.

In any case, when printing is requested from a laboratory by bringing such an image file to generate postcards, excess prints are prevented from being printed by the configuration shown in FIG. 8.

It is possible not to print the excess prints. However, in that case, it cannot be judged in a laboratory dealing with a large number of prints whether the printer is out of order, or if an operator has mistaken the quantity. On the other hand, in the case where the prints have been generated according to the quantity specified by a customer, it can be confirmed easily that the laboratory did not make a mistake.

In the case where the image file described above is copied, the effect of controlling the permitted quantity is weakened. Still, when the permitted print quantity information and an ID identifying the image (identification information) are embedded in the image data as an electronic watermark and the printer counts the number of prints that have ever been generated, copyright protection becomes possible at a high accuracy if a total number of prints of the image generated by a plurality of printers is easily understood via communication between laboratories.

Figure 6:
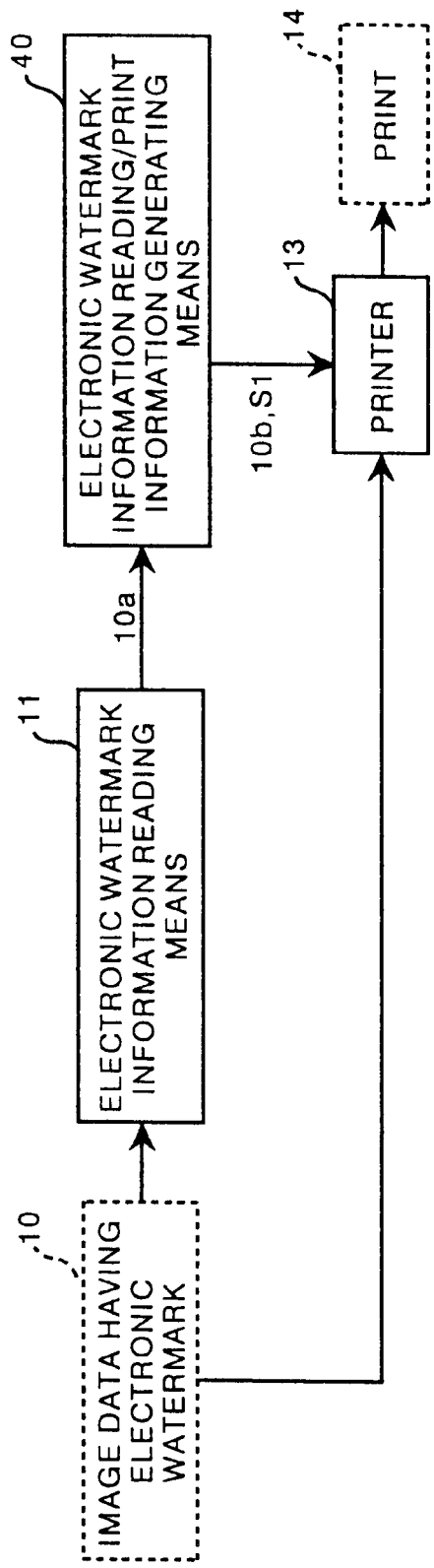
FIG. 6 is a block diagram showing an image printing apparatus according to a third embodiment.
Figure 7:
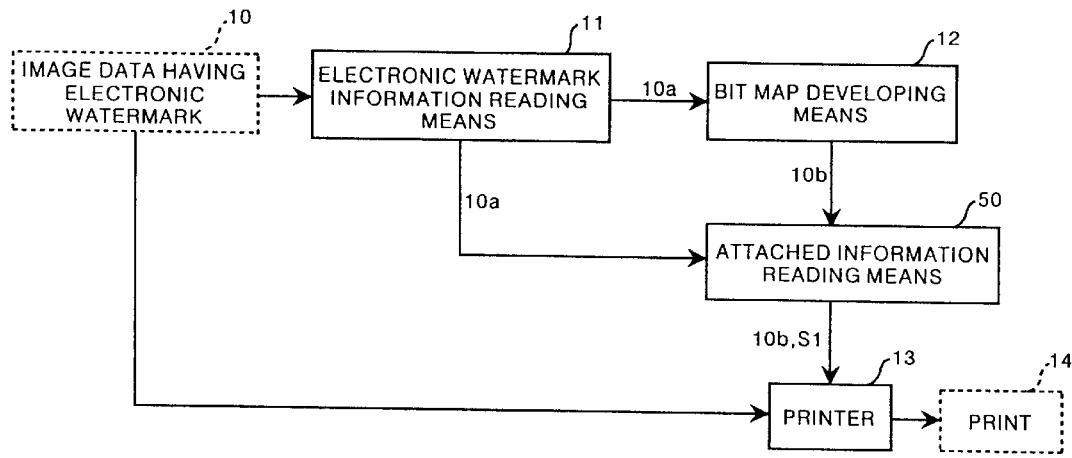
FIG. 7 is a block diagram showing an image printing apparatus according to a fourth embodiment.

The printer 13' shown in FIG. 8 has the same operation and effect when adopted in the apparatuses shown not only in FIG. 7 but also in FIG. 6 and the like.

In the above example, the permitted print quantity information 10c is attached to the header of the image data 10 having the electronic watermark. However, the permitted print quantity information may be recorded in the form of an electronic watermark so that the permitted quantity can be understood by reading the electronic watermark.

What is claimed is:

1. An image printing method for obtaining an image print from image data having deep layer information which is visually imperceptible when provided for image reproduction, the method comprising the steps of:

reading the deep layer information from the image data;

developing the deep layer information having been read into data which are visually perceptible when provided for image reproduction; and printing the content of the developed data on the front and/or back of the image print, wherein whether or not the content of the developed data is printed can be selected.

2. An image printing method as claimed in claim 1, wherein a position at which the content of the developed data is printed can be selected.

3. An image printing method for obtaining an image print from image data having deep layer information which is visually imperceptible when provided for image reproduction, the method comprising the steps of:

reading the deep layer information from the image data;

developing the deep layer information having been read into data which are visually perceptible when provided for image reproduction; and printing the content of the developed data on the front and/or back of the image print, wherein the deep layer information is generated as information instructing additional printing and print information which can be seen when provided for image reproduction are generated as the developed data, based on the deep layer information having been read.

4. An image printing method as claimed in claim 3, wherein the image data accompanies information indicating a position to print the content of the developed data, and the position at which the content is printed is determined based on the information.

5. An image printing method for obtaining an image print from image data having deep layer information which is visually imperceptible when provided for image reproduction, the method comprising the steps of:

reading the deep layer information from the image data;

developing the deep layer information having been read into data which are visually perceptible when provided for image reproduction; and printing the content of the developed data on the front and/or back of the image print, wherein the image data accompanies information indicating a permitted print quantity.

6. An image printing method as claimed in claim 5, wherein a predetermined message is recorded on the print when the number of prints exceeds the permitted print quantity.

7. An image printing method as claimed claim 6, wherein the predetermined message is recorded on the front of the print.

8. An image printing method for obtaining an image print from image data having deep layer information which is visually imperceptible when provided for image reproduction, the method comprising the steps of:

reading the deep layer information from the image data;

developing the deep layer information having been read into data which are visually perceptible when provided for image reproduction; and printing the content of the developed data on the front and/or back of the image print, wherein information indicating a permitted print quantity is set as a portion of the deep layer information.

9. An image printing apparatus for obtaining an image print from image data having deep layer information which is visually imperceptible when provided for image reproduction, the apparatus comprising:

deep layer information reading means for reading the deep layer information from the image data;

developing means for developing the deep layer information having been read into data which are visually perceptible when provided for image reproduction;

printing means for printing the content of the developed data on the front and/or back of the image print; and means for selecting whether or not the content indicated by the developed data is printed.

10. An image printing apparatus for obtaining an image print from image data having deep layer information which is visually imperceptible when provided for image reproduction, the apparatus comprising:

deep layer information reading means for reading the deep layer information from the image data;

developing means for developing the deep layer information having been read into data which are visually perceptible when provided for image reproduction;

printing means for printing the content of the developed data on the front and/or back of the image print, and electronic watermark information reading/print information reading/print information generating means for reading information indicating additional printing from the deep layer information read by the deep layer information reading means; and for generating print information which is visually perceptible when provided for image reproduction, based on the information indicating the additional printing; and for inputting the print information to the printing means as the developed data.

11. An image printing apparatus for obtaining an image print from image data having deep layer information which is visually imperceptible when provided for image reproduction, the apparatus comprising:

deep layer information reading means for reading the deep layer information from the image data;

developing means for developing the deep layer information having been read into data which are visually perceptible when provided for image reproduction;

printing means for printing the content of the developed data on the front and/or back of the image print; and attached information reading means for reading information of a position at which the content of the developed data is printed, from the image data having the information, and for specifying the position at which the content is printed by the printing means, based on the information having been read.

12. An image printing apparatus for obtaining an image print from image data having deep layer information which is visually imperceptible when provided for image reproduction, the apparatus comprising:

deep layer information reading means for reading the deep layer information from the image data;

developing means for developing the deep layer information having been read into data which are visually perceptible when provided for image reproduction;

printing means for printing the content of the developed data on the front and/or back of the image print; and means for reading information indicating a permitted print quantity attached to the image data; and recording a predetermined message on the print in the case where the number of prints exceeds the permitted print quantity.

13. A recording medium storing software for executing an image printing method as claimed in claim 1, 3, 4, 5, or 8.

14. An image printing method as claimed in claim 1, 5, or 8, wherein the deep layer information having been read is developed into bit map data.

15. An image printing method as claimed in claim 1, 3, 4, 5 or 8, wherein the content shown by the developed data is printed on the front of the image print in superposition on a printed image.

16. An image printing apparatus as claimed in claim 12, wherein the means for recording the predetermined message records the message on the front side of the print.

17. An image printing apparatus for obtaining an image print from image data having deep layer information which is visually imperceptible when provided for image reproduction, the apparatus comprising:

deep layer information reading means for reading the deep layer information from the image data;

developing means for developing the deep layer information having been read into data which are visually perceptible when provided for image reproduction;

printing means for printing the content of the developed data on the front and/or back of the image print; and means for
reading information which indicates a permitted print quantity and is formed as a portion of the deep layer information, and recording a predetermined message on the print in the case where the number of prints exceeds the permitted print quantity.

\* \* \* \* \*